UNITED STATES PATENT OFFICE 2,439,345

HYDROCARBON-SUBSTITUTED THIACY-CLOPENTANE-1,1-DIOXIDE

Rupert C. Morris, Berkeley, Calif., assignor to Shell Development Company, San Francisco, Calif., a corporation of Delaware No Drawing. Application July 13, 1943, Serial No. 494,587

4 Claims. (Cl. 260—329)

This invention relates to a novel and particularly useful class of compounds. More particularly, the invention pertains to a certain novel and useful class of substituted cyclic sulfones. Specifically, the invention is directed to sulfolanes and sulfolenes having at least one substituted or unsubstituted unsaturated hydrocarbon radical attached to a nuclear carbon atom of the sulfolane or sulfolene ring by means of a single carbon-to-carbon linkage.

The term "sulfolene," as employed herein and in the appended claims, refers to an unsaturated structure containing four carbon atoms, a single olefin linkage between any two adjoining carbon atoms, and a sulfur atom in a ring, the sulfur atom of this five-membered heterocyclic unsaturated ring having two oxygen atoms attached thereto. This compound has also been called "thiacyclopentene-1,1-dioxide." Similarly, the term "sulfolane," as employed herein and in the appended claims, refers to a saturated sulfolene. In other words, the sulfolane contains or consists of a saturated five-membered ring of four carbon atoms and a sulfur atom, which latter has two oxygen atoms attached thereto. The general structural formula of the simple unsubstituted sulfolane, therefore, is:

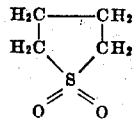

This compound has also been termed "thiacyclopentane - 1,1 - dioxide," "thiolane-1,1-dioxide," "cyclotetramethylene sulfone" or "dihydro butadiene sulfone." Generically, the term "sulfolane" covers not only the above compound, but also the substituted derivatives of this compound. As stated, the double bond in the sulfolenes may be between any two of the adjacent carbon atoms of the ring, the generic term "sulfolene" covering both the simple, unsubstituted sulfolenes, i. e., 3-sulfolene having the structure:

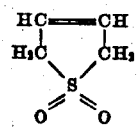

and 2-sulfolene having the structure:

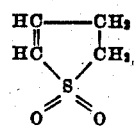

as well as the various derivatives thereof, i. e. sulfolenes in which various radicals are substituted for one or more of the hydrogen atoms of the above structures.

It is an object of the present invention to provide a new class of chemical compounds. A further object is to provide a novel class of compounds possessing unexpectedly useful properties. Other objects will be apparent from the following description of the present invention.

Unsubstituted sulfolane, as well as both unsubstituted sulfolenes, i. e. 2-sulfolene and 3-sulfolene, have been known for some time. Also, some substituted solfolanes and sulfolenes have been previously prepared. In all of these compounds the side chain or chains attached via a carbon-to-carbon bond to the ring consisted of saturated aliphatic or aromatic radicals. Substituted sulfolanes and sulfolenes containing a methylene group directly attached to a nuclear carbon atom by a double bond are also known. It has now been discovered that sulfolane and sulfolene derivatives containing a substituted or unsubstituted unsaturated hydrocarbon radical attached to the ring by a single carbon-to-carbon linkage, surprisingly possess inherent properties which render said compounds unexpectedly and markedly superior to those of the corresponding sulfolane or sulfolene derivatives containing an aromatic or saturated aliphatic side chain, or those containing a methylene group directly attached to the nucleus by a double bond. These properties could not be foreseen and are of such a nature that they make the compounds of the present invention particularly useful in various applications.

Broadly, the novel compounds of the present invention consist of substituted sulfolanes and sulfolenes containing at least one substituted and/or unsubstituted, unsaturated hydrocarbon radical attached to the sulfolane or sulfolene ring via a single carbon-to-carbon linkage. In the case of the sulfolane derivatives, the novel compounds may be represented by the following general structural formula:

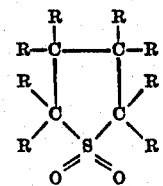

wherein at least one of the R radicals attached to the nuclear carbon atoms is an unsubstituted or substituted, unsaturated hydrocarbon radical attached to the nuclear carbon atom via a single carbon-to-carbon linkage, and wherein the other R radicals are the same or different substituents comprising the hydrogen atom, a halogen atom, a hydroxyl radical and/or an organic radical, preferably a hydrocarbon radical, such as an alkyl, alkenyl, cyclo-alkyl, cyclo-alkenyl, aryl, aralkyl or alkaryl group.

Similarly, in the case of the novel sulfolene derivatives, the general structural formula is substantially the same as that presented above, with the exception that the sulfolene ring contains at least one double bond between two adjacent carbon atoms of the ring structure. For instance, with a double bond in the beta- or 3-position, the novel sub-class of compounds of the present invention is represented by the following general structural formula:

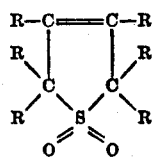

wherein at least one of the R radicals is an unsubstituted or substituted, unsaturated hydrocarbon radical attached to a nuclear carbon atom by a single carbon-to-carbon linkage, while the remaining R radicals are the same or different substituents of the character described above with reference to the corresponding novel sub-class of substituted sulfolane derivatives.

A preferred sub-group of novel compounds comprises the sulfolanes and sulfolenes in which a single unsubstituted or substituted, unsaturated hydrocarbon radical is attached via a single carbon-to-carbon linkage to the ring at the 2- or 3-position, the remaining free bonds of the nuclear carbon atoms being taken up by hydrogen atoms, halogen atoms, hydroxyl radicals and/or saturated aliphatic radicals.

The numbering system of the sulfolane (thiolane) or sulfolene ring is indicated below:

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure:

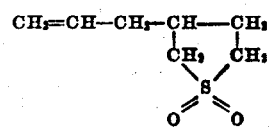

which is named 3-allyl sulfolane, and the compound

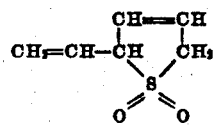

which is called 2-vinyl-3-sulfolene. Another sub-group of novel compounds comprises the sulfolanes and sulfolenes having two or more of the aforementioned unsaturated substituents attached to the ring, each by means of a single carbon-to-carbon linkage. This group may be exemplified by 2,5-divinyl-3-sulfolene which has the following structural formula:

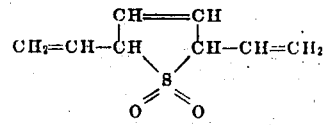

The unsaturated, unsubstituted or substituted radicals attached to the sulfolane or sulfolene ring include: the unsaturated hydrocarbon radicals having a single bond for attachment to the ring, e. g. vinyl, allyl, propenyl, crotyl, methyl vinyl carbinyl, butenyl, pentenyl, hexenyl, methallyl, isocrotyl, cyclopentenyl, cyclohexenyl, isopentenyl, octenyl, nonenyl, oleyl, cinnamyl and phenyl vinyl carbinyl radicals, as well as the unsaturated radicals of the type of

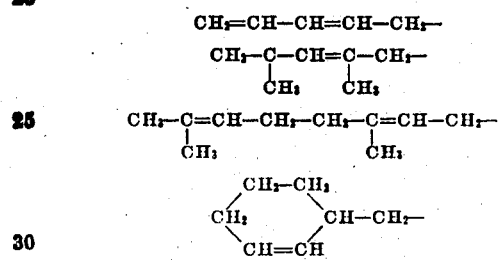

the halo-substituted derivatives of the above and other similar unsaturated hydrocarbon radicals, such as 2-chlor-allyl, 3-chlor-allyl, 2-brom-allyl, 2-bromcrotyl, 2-chlor-crotyl, and the like; the oxygenated derivatives of the above class of unsaturated hydrocarbon radicals, i. e. their aldehydes, alcohols, glycols, ethers, esters, ketones, and similar oxygenated derivatives, all of which derivatives have a single bond for the attachment of the radical to the sulfolane or sulfolene ring via a carbon-to-carbon connection, the following being examples of such radicals:

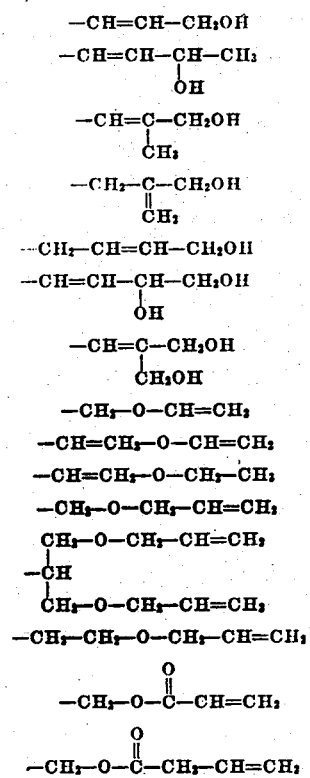

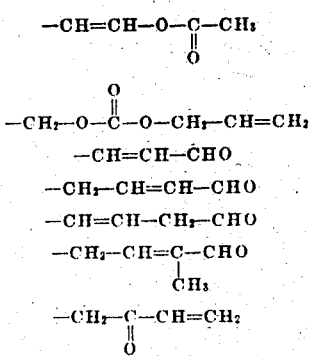

and the like, and their homologues and analogues; unsaturated organic compounds containing a sulfur atom (such as the unsaturated thio-ether radicals) and/or a nitrogen atom or atoms, e. g. radicals or groups of the type of

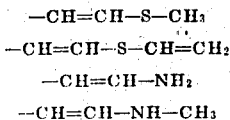

and the like, and their homologues and analogues; as well as combinations thereof, e. g. unsaturated amide or sulfonate radicals. In all of these cases, the unsaturated organic radical is attached directly to a carbon atom of the sulfone ring via a single carbon-to-carbon linkage. As mentioned above, the novel class of sulfolanes and sulfolenes contains at least one such unsaturated organic radical, the remaining free bonds of the carbons of the sulfolane or sulfolene ring being satisfied with the same or different atoms or groups, such as hydrogen atoms, halogen atoms, hydroxyl radicals, or organic radicals, which are preferably hydrocarbon radicals, and especially saturated acyclic radicals.

Excluded from the scope of the invention are those compounds wherein the substituent or substituents attached to the sulfone ring contain no other carbon-to-carbon double bonds except those of an aryl, e. g. a phenyl, group. This is because a phenyl group is not considered by those skilled in the art to be an unsaturated radical. Thus, a phenyl group does not possess the necessary unsaturation within the meaning of the term "unsaturated" as used herein, and it is the presence of the unsaturated group or groups (which are in the side chain proper, and not between the ring and said chain) which gives the compounds of the invention their characteristic superior properties as compared to the corresponding or similar substituted sulfolanes or substituted sulfolenes devoid of such unsaturation. It will be understood, however, that the compounds which possess unsaturated groups in addition to the aryl group are not to be construed as excluded from the scope of the invention, reference being made for instance to compounds such as 3-cinnamyl sulfolane, 2(2-phenylallyl) sulfolane, and the like.

As examples of particular new compounds included within the scope of the present invention are: 2 - vinyl-2-sulfolene, 2 - vinyl-3-sulfolene, 2-vinyl sulfolane, 3-vinyl sulfolane, 3-allylsulfolane, 2-(2-chlorallyl)-2-sulfolene, 2,4-divinyl-3-sulfolene, 3-methallylsulfolane, 3-vinyl-4-chlor-3-sulfolene, 2-(2-bromallyl) sulfolane, 2-allyl-3-hydroxy sulfolane, 2-(2-hydroxyallyl) sulfolane, 2-cyclopentenyl sulfolane, 2-cyclopentenyl-3-sulfolene, allyl ether of 3-methylol sulfolane, beta-(2-Δ³-sulfolenyl) divinyl ether, 2-(2-hydroxyallyl) - Δ³ - sulfolene, 2 - ( 4 - hydroxy - 2 - butenyl) - Δ³ - sulfolene, beta -(3-Δ³- sulfolenyl) acrolein, alpha-(4-vinyl-2-sulfolanyl) acetaldehyde, vinyl 3-sulfolanyl ketone, isopropenyl 3-sulfolanyl ketone, allyl 2,4-dimethyl-3-Δ⁴-sulfolenyl ketone, allyl beta-(3-sulfolanyl)-ethyl amine, diallyl beta-(3-sulfolanyl)-ethyl amine, N-beta-(3-sulfolanyl)-ethyl acrylamide, N-allyl 3-sulfolanylcarboxamide, N,N-diallyl 3-sulfolanyl-carboxamide, 3-allyl-4-sulfolanyl p-toluene sulfonate, and the like.

The novel compounds of the present invention may be produced in a number of various ways depending in part on the specific starting material or materials employed and/or on the desired novel compound sought to be formed. For instance, a 3-sulfolene derivative containing one or more unsaturated acyclic hydrocarbon side-chains may be prepared by reacting a suitable poly-olefinic hydrocarbon containing at least three olefinic linkages, at least two of which are in conjugated position, with sulfur dioxide under conditions favoring an addition reaction. The following is a specific example of the application of this procedure to the production of 2-vinyl-3-sulfolene. Substantially peroxide-free hexatriene (i. e. a hydrocarbon having the general structural formula $CH_2=CH-CH=CH-CH=CH_2$) is mixed with liquid sulfur dioxide, which is preferably employed in an amount which is at least stoichiometrically sufficient to react, mol per mol, with said hexatriene. These reactants are then heated to an elevated temperature which is however below that at which the cyclic monosulfones thus formed will decompose. Generally, this reaction temperature is in the neighborhood of about 100° C. However, somewhat higher temperatures may also be used as long as they are below the aforementioned decomposition temperature. The reaction is conducted for a period of time sufficient to effect the desired degree of interaction between the sulfur dioxide and the poly-olefin, this residence time depending on the specific poly-olefin treated, the employed mol ratio of sulfur dioxide to the poly-olefin, the operating pressure, and other operating conditions. Thus, the above hexatriene reacts readily with sulfur dioxide when the reaction is effected at the above-mentioned temperature and at a pressure which maintains the reactants in the liquid state, or at least maintains a liquid phase in the reaction zone (e. g. a pressure of between about 100 lbs. per sq. in. and about 500 lbs. per sq. in.), particularly when the sulfur dioxide is employed in an amount which is greatly in excess of that necessary to combine with the hexatriene. On the other hand, acyclic poly-olefins containing a tertiary unsaturated carbon atom, which carbon atom is one of the two to which the sulfur dioxide adds to form the cyclic unsaturated sulfone, require a comparatively considerably longer residence time to attain the same degree of conversion. As stated, under the optimum conditions of operation mentioned above (i. e. a reaction temperature of about 100° C., a super-atmospheric pressure sufficient to maintain the reactants in the liquid state, and the use of for example about 4 mols of liquid sulfur dioxide per mol of the hexatriene), a substantially quantitative conversion to 2-vinyl-3-sulfolene will be attained by effecting the above reaction between hexatriene and sulfur dioxide for a period of only a few minutes, e. g. a residence time of less than one hour, the reaction product containing only minor amounts, if any, of by-products of the type of hydrocarbon polymers and/or poly-sulfones.

The corresponding 2-vinyl-sulfolane may be prepared, for example, by subjecting 2-vinyl-3-sulfolene to the action of hydrogen at substantially atmospheric pressures and temperatures, and in the presence of a suitable hydrogenation catalyst, e. g. pyrophoric nickel metal catalyst, platinum, or the like, to form 2-ethyl-sulfolane, this latter being then catalytically dehydrogenated to produce the desired 2-vinyl-sulfolane. Care should be taken to conduct the last-mentioned dehydrogenation reaction under such conditions and for such a period of time that dehydrogenation occurs only in the side-chain (and even this only to the desired degree) and that there is no or substantially no dehydrogenation of the sulfolane ring proper.

Another method of producing sulfolanes containing an unsaturated hydrocarbon radical attached to the ring via a single carbon-to-carbon linkage comprises a reaction between a poly-olefinic ester, e. g. a poly-olefinic acetate, and sulfur dioxide to form the corresponding substituted sulfolene, this latter being then hydrogenated and the reaction product thus produced being then treated, e. g. by heating to a suitable temperature to split off acetic acid. For instance, hexadiene acetate may be reacted with sulfur dioxide under the above-outlined conditions which favor the formation of the following substituted sulfolene derivative:

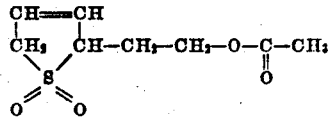

This compound may then be subjected to hydrogenation, for example, by reacting it with hydrogen under substantially atmospheric pressure and in the presence of a hydrogenation catalyst, such as pyrophoric nickel, to saturate the double bond in the sulfone ring. When this saturated compound is then heated, for instance to a temperature of from about 200° C. to about 500° C., acetic acid is split off, thus producing 2-vinyl-sulfolane.

Still another method of producing the novel compounds of this invention includes the step of interacting a sulfolane or sulfolene derivative having an active substituent, e. g. a halogen atom, directly attached to a ring carbon atom, with a Grignard reagent which contains an unsaturated hydrocarbon, e. g. alkenyl, radical. For example, 2,4-dimethyl-3-chloro-Δ⁴-sulfolene may be reacted with methallylmagnesium chloride to form 2,4 - dimethyl - 3 - methallyl-Δ⁴-sulfolene.

Similarly, 2,3-dimethyl-2-bromo-sulfolane may be reacted with crotylmagnesium bromide to produce 2,3-dimethyl-2-crotyl-sulfolane.

The products of the present invention are of value in a large variety of industries and as intermediates in various chemical syntheses. For instance, at least some of these compounds are highly useful as plasticizers and tackifiers in natural and synthetic compositions, while some of the same and other compounds of the novel class are of value in the resin and lacquer industry as solvents and plasticizers for the manufacture of dopes, fabric coatings, sprays and moulding compositions. Other uses are as insecticides, antioxidants, pourpoint depressants, extracting agents, ingredients in cosmetics, as base materials and fixing agents in the preparation of perfumes, as softening agents for the leather industry, and as selective solvents in extractive distillation processes.

I claim as my invention:

1. 2-vinyl-sulfolane having the general structural formula

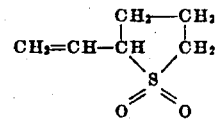

2. A hydrocarbon-substituted thiacyclopentane-1,1-dioxide containing as the sole substituent an alkenyl radical attached to a nuclear carbon atom of the thiacyclopentane-1,1-dioxide ring via a single carbon-to-carbon linkage.

3. A hydrocarbon-substituted thiacyclopentane-1,1-dioxide containing as the sole substituent an alkenyl radical of not more than four carbon atoms attached directly to a nuclear carbon atom of the thiacyclopentane-1,1-dioxide ring via a single carbon-to-carbon linkage.

4. A hydrocarbon-substituted thiacyclopentane-1,1-dioxide having an unsubstituted unsaturated hydrocarbon radical, which radical is directly attached to a nuclear carbon atom of the thiacyclopentane-1,1-dioxide ring via a single carbon-to-carbon linkage, said unsaturated hydrocarbon radical containing at least one unsaturated linkage between two carbon atoms of aliphatic character.

RUPERT C. MORRIS.

REFERENCES CITED

The following references are of record in the file of this patent:

Backer, Recueil Des Travaux Chimiques Des Pays-Bas, vol. 58 (1939), pages 778–784.